May 30, 1933.  J. G. BAILEY  1,912,172
BROADCASTER DISTRIBUTING MACHINE
Filed Dec. 19, 1929   3 Sheets-Sheet 1
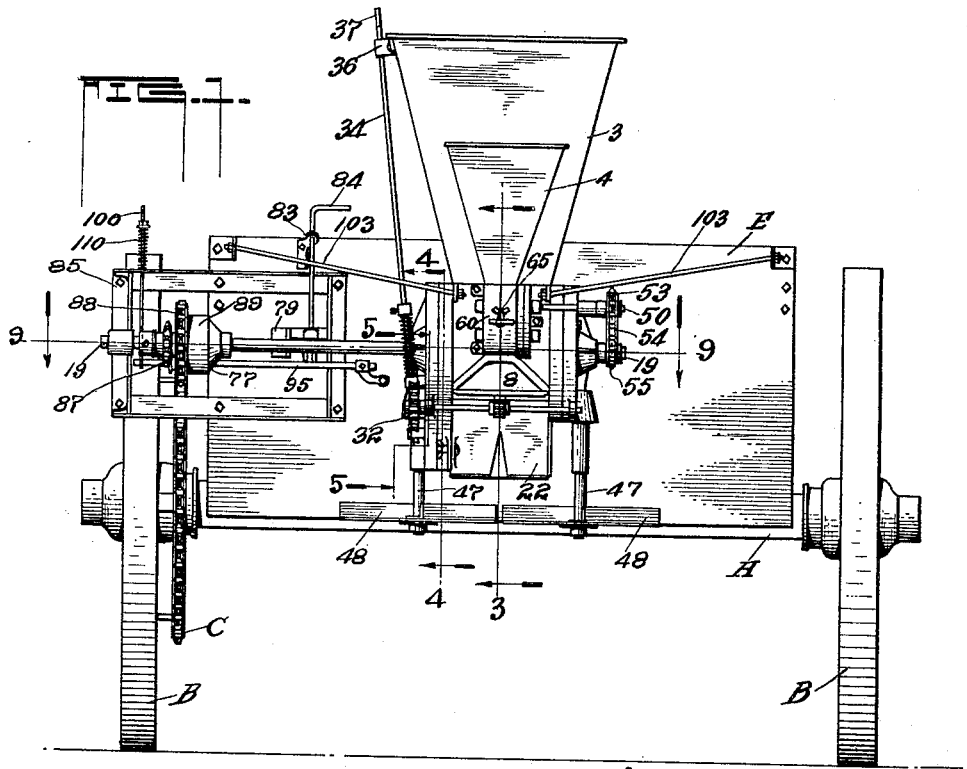
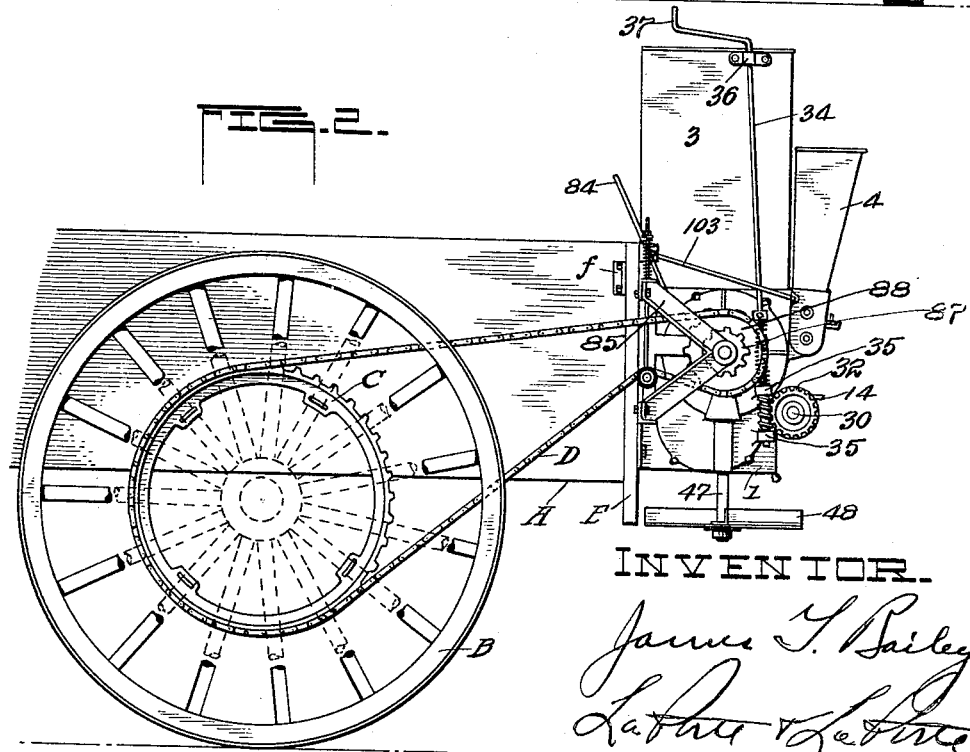
INVENTOR
James G. Bailey
ATTY'S May 30, 1933. J. G. BAILEY 1,912,172
BROADCASTER DISTRIBUTING MACHINE
Filed Dec. 19, 1929 3 Sheets-Sheet 2
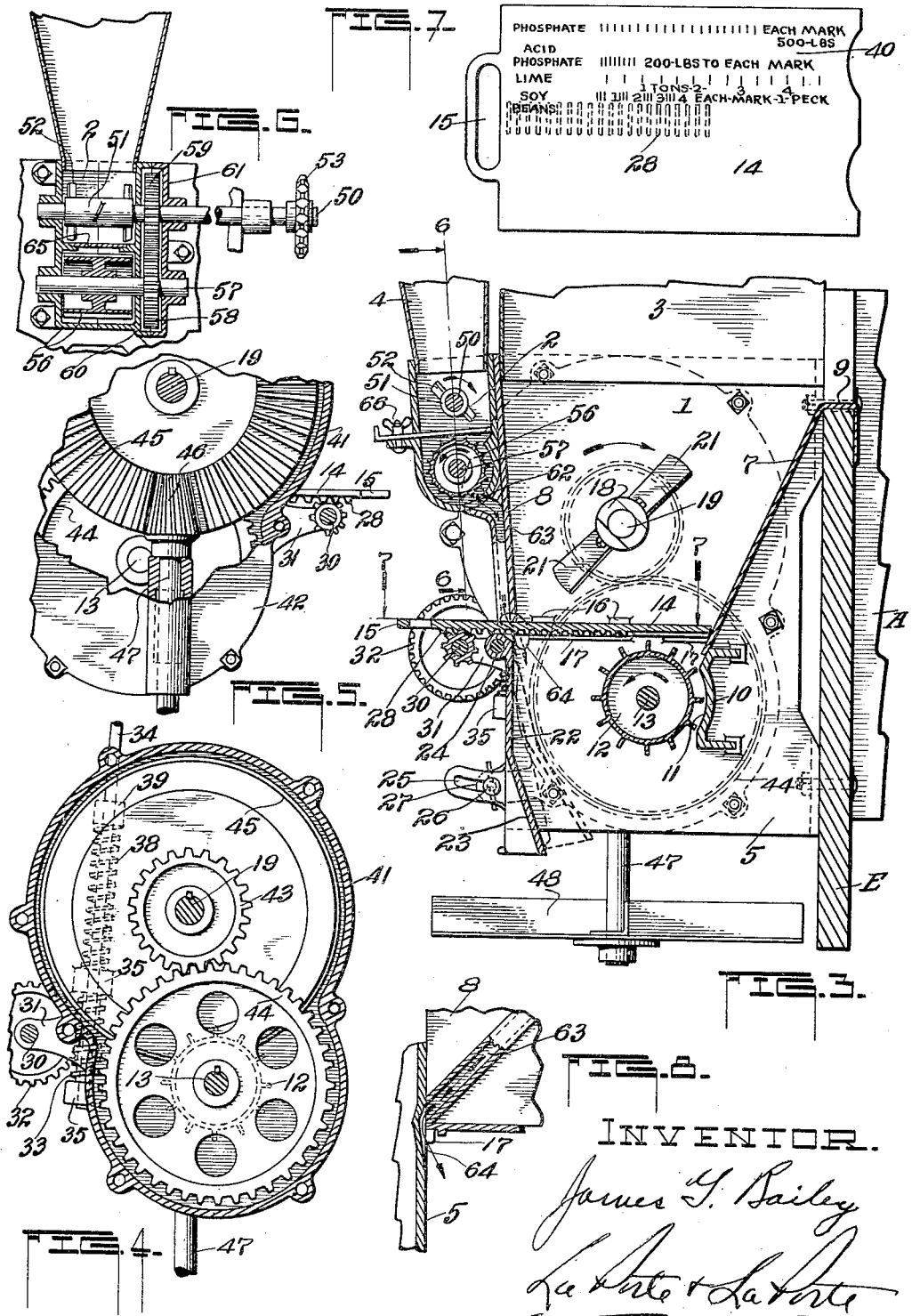

May 30, 1933.  J. G. BAILEY  1,912,172
BROADCASTER DISTRIBUTING MACHINE
Filed Dec. 19, 1929   3 Sheets-Sheet 3
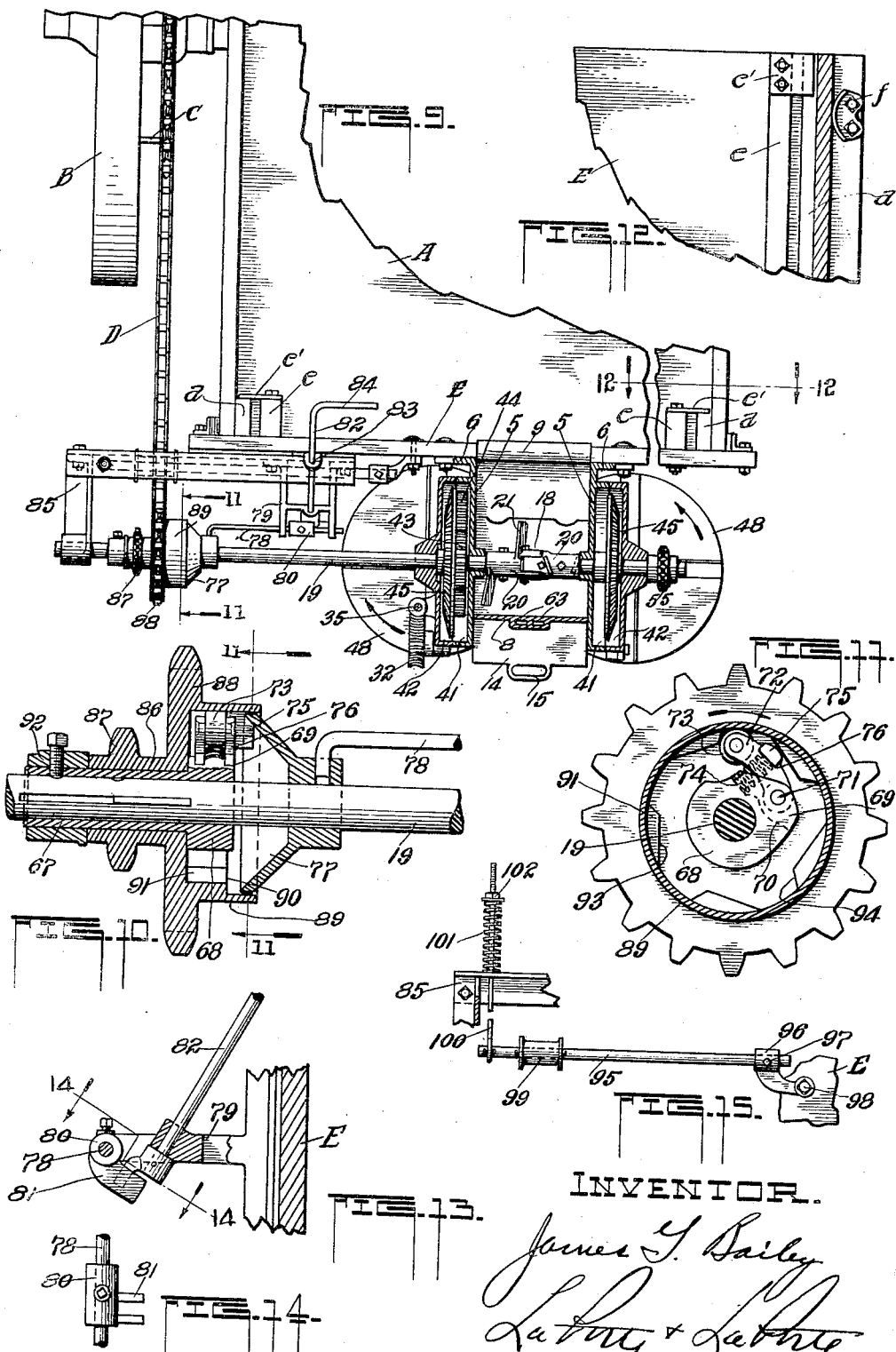
INVENTOR.

Patented May 30, 1933

1,912,172

UNITED STATES PATENT OFFICE

JAMES G. BAILEY, OF DELAVAN, ILLINOIS

BROADCASTER DISTRIBUTING MACHINE

Application filed December 19, 1929. Serial No. 415,152.

This invention has reference to broadcast distributing machines, particularly of the end gate type and wherein distributing fans are employed to broadcast the material over a field.

The invention has for its principal object to provide a broadcasting machine which is useful for the distribution of grain and grass seeds as well as soil treating materials, as for example, phosphates, lime and other and various materials.

The invention has for an object to improve the agitating means, the valve means for regulating the quantity and flow of materials, including gauges readily readable by an attendant to enable him to adjust said valve means in a very definite way, and further, in the provision of a new and improved regulating and deflecting means to direct materials to different positions onto the distributing fans whereby to insure uniform and proper feeding of material onto the fans.

The invention has for a further object to improve the structure by means of which grass and grain seeds may be commingled and discharged onto the distributing fans, and furthermore, to a structure wherein is included the feeding roller to provide sufficiently large egress feed-ways from the feeding roller to the distributing fans to prevent clogging of materials, such for instance, as the soil treating materials, which at times become moist and difficult to feed and which are more efficiently handled under such conditions by the structure which I employ.

A further object of the invention is to provide a changeable speed device for the operation of the feeding and distributing means, which include the agitators, the feed rollers and distributing fans, such changeable speed means being for the purpose of accommodating the machine for the distribution of materials of various kind and grade.

The invention has for a further object to provide a manual control including a frictional retaining means for the adjustment and holding of the valve means which regulates the quantity and flow of material to the feed rollers and distributing fans.

The invention has a still further object to improve the clutch control means in the drive means from the vehicle wheel to the distributor mechanism, which is so constructed that upon the sudden stopping of the vehicle the clutch means automatically acts to interrupt the drive and allow the operating parts of the distributor to idle to a complete stop and without abruptness, which when permitted, increases the possibility of breakage and dislodgement and disarrangement of parts.

The invention further comprehends a structure where the main driving gearing is located on opposite sides of the housing for the distributor and encased within suitably constructed housings to permit the gearing to run in oil, if desired, and to protect the gearing from the accumulation of dirt, dust and other extraneous matter therein and thereon, and thereby insure an easy and quiet running machine and lessening the maintenance of the machine and the draft requirements to pull the machine over the ground; and, furthermore, in the inclusion of attachments on the end gate to prevent spreading of the side boards of the vehicle under the action of cumbersome and heavily loaded materials, the use of which eliminates the necessity of the use of tie rods on the attachment of the end gate to a vehicle.

Other and further objects will more fully appear from the following description.

That the invention may be more fully understood, reference is had to the accompanying drawings, forming part of this description, illustrating a preferred embodiment of the invention, in which:—

Fig. 1 is a rear elevation of a vehicle with an end gate attached thereto which is shown supporting my improved broadcast distributor;

Fig. 2 is a side elevation looking in at the left hand side of Fig. 1;

Fig. 3 is an enlarged vertical sectional detail as the same would appear if taken on the line 3—3, Fig. 1;

Fig. 4 is an enlarged vertical sectional detail as the same would appear of taken on the line 4—4, Fig. 1;

Fig. 5 is an enlarged vertical sectional detail as the same would appear if taken on the line 5—5, Fig. 1;

Fig. 6 is a vertical, sectional detail as the same would appear if taken on the line 6—6 of Fig. 3;

Fig. 7 is a plan view of the valve and gauge board with the gauges thereon as the same would appear looking down in plan on the line 7—7, Fig. 3;

Fig. 8 is a sectional detail of the feedway when the grass seed and smaller grains are caused to be fed to and mingle with the materials discharged into and from the main hopper casing;

Fig. 9 is a plan view partially in section and partly broken away as the same would appear if taken on the line 9—9, Fig. 1;

Fig. 10 is an enlarged longitudinal sectional detail through the clutch means included in the drive;

Fig. 11 is a cross-section of parts shown in Figs. 9 and 10 and as the same would appear if taken on the lines 11—11 of Figs. 9 and 10, respectively;

Fig. 12 is an enlarged sectional detail of the means for preventing the side walls of the vehicle from spreading when the end gate is attached, and as the same would appear if taken on the line 12—12, Fig. 9, looking in the direction of the arrows;

Fig. 13 is a detail partly in section of a connection in the manual clutch shifting means;

Fig. 14 is a detail as the same would appear if taken on the line 14—14, Fig. 13; and Fig. 15 is a detail of an idler means for the chain drive from the vehicle to the driving shaft of the distributor.

Like characters of reference denote corresponding parts throughout the figures.

In the drawings a vehicle designated A is of the type to which distributors of the class herein described is attached to be drawn over a field to be seeded or on which a suitable fertilizer may be spread. The vehicle has the usual vehicle wheels B to one of which is secured the ring-like sprocket wheel C which drives a sprocket chain D for transmitting motion to the operative parts of the distributor.

An end-gate E of the usual type is employed for attachment to the end of the vehicle and said end gate supports the distributor, whereby the distributor may be attached to and removed from the end of the vehicle.

As disclosed, there are attached to the inside of the end gate, vertical cleats e to which are attached riders e' which cooperate with cleats a vertically disposed and secured to the side boards of the vehicle. In the preferred construction of the end gate it overlaps or extends beyond the side boards of the vehicle and to the extended portions of the said end gate there are attached friction bearing plates f which bear against the outside of the side boards in the manner shown in Figs. 9 and 12 so that when the end gate is in attached position on the end of the vehicle, the plates f coact with the riders e' in retaining the end gate in attached position and, furthermore, the plates f prevent spreading of the side boards under the weight or pressure of the materials deposited in the vehicle preparatory to being distributed. Furthermore, the use of the plates f and the riders e' obviate the necessity of using spacing and connecting rods between the side boards, at the tail end of the vehicle which when used interfere with an attendant shoveling material from within the vehicle to the hopper or hoppers of the distributor.

The distributor proper includes two hoppers 1 and 2, the former provided with a superimposed extension 3 and the latter with a superimposed extension 4. The hopper 1, which is the main hopper, is adapted to receive grain seed of whatever kind it is desired to distribute, or a fertilizer of whatever kind it is most suitable for the soil to be treated. The hopper 2 is adapted for use to receive preferably grass seed and in this class of machines is commonly known as the grass seed hopper. The said hopper 1 is preferably a casting formed with the straight vertical side walls 5 which are provided with angular extensions 6 to adapt the said hopper 1 to be bolted or otherwise suitably secured to the end gate E, see Figs. 3 and 9. The inner wall 7 of the main hopper 1, that is, the wall next adjacent the end gate, is a rather definitely downwardly and outwardly inclined wall, which extends from the top of the main hopper 1 to a point somewhat removed above the bottom of said hopper and together with the outside wall 8 of the hopper 1 provides a throat at the terminus or lower end of the wall 7 between which the material deposited in the hopper 1 may, by agitation, be discharged onto a feed roller and ejected onto the distributing fans to be described. The upper end of the wall 7 has an angular formation 9 to overlie and rest on the upper edge of the end gate and extends over the end gate throughout the width of the main hopper 1 between its side walls 5. The lower edge of the wall 7 coacts with a partition 10 in the lower portion of the main hopper 1 having a curved front face 11 complementary to the sweep of a fluted feed roller 12 which is carried and rotated by a feed roller shaft 13 which extends through the hopper and has a journal bearing in its side walls 5. The wall 8 of the main hopper 1 is inclined downwardly and inwardly, as shown in Fig. 3, and its lower edge terminates in a horizontal plane slightly above the lower edge of the wall 7 and slidably arranged below the lower edge of the wall 8 is a valve plate 14 which is adapted to be moved inwardly to close the throat within the hopper by its inner edge being brought into abutting relation with the lower end portion of the wall 7, also best seen in Fig. 3, and said valve plate extends from without the main hopper 1 and at its outer portion is provided with a hand grip 15, although the valve plate is adapted for adjustment by manually operated gearing for moving the said valve plate outwardly to open the throat providing a communicating means between the agitating means in the upper part of the main hopper 1 and the feed roller 12 in the lower portion of said hopper, or to close said throat to prevent the discharge of material from said hopper. The valve plate is sustained in operative position and guided in its movements by means of the guides 16 and 17. In the upper portion of the main hopper 1 is arranged an agitator means 18 carried on a drive shaft 19 having a journal bearing in the walls 5 of the hopper. This agitator comprises a pair of sleeves 20 which are coupled to each other as shown in Fig. 9 and said sleeves are provided with radially arranged wings or vanes 21. The wings or vanes of both sleeves agitate the material deposited in the main hopper 1, to keep it in a loose state and insure its proper feeding through the throat portion of the hopper to the feed roller and it will be observed by reference to Fig. 9 that the alternate wings or vanes of the respective sleeves are so inclined in their radial projection from the axis of the sleeves as to direct the material from the side walls of the hopper toward the center thereof and outwardly again so that there is a constant separation of the material whereby to insure an efficient and uniform discharge through the throat of the hopper to the feed roller.

The lower continuating wall of the wall 8 is designated 22 and by examining Fig. 3 it will be noticed that this wall 22 has the function of a deflecting wall being adjustable and having a very pronounced lower and inwardly inclined portion 23. The upper end portion of the wall 22 is pivoted at 24 to permit its lower end to be moved inwardly and outwardly and for fixing this wall in different adjusted positions, the said wall is provided with a slotted ear 25 in which operates an adjusting screw 26 carried through an ear 27 from one of the side walls of the hopper. By loosening the adjusting screw 26 the wall 22 may be moved to different adjusted positions and the screw 26 tightened up for securing this deflecting wall in any such adjusted position. The feed roller 12 is normally rotated to throw the material deposited thereon over outwardly towards the wall 22 and thence downwardly and by adjusting the wall 22 the point of discharge of the material onto the distributing fans, to be described, may be determined and controlled.

The valve plate 14 is provided with a rack 28 on its under side and said rack is in mesh with a gear pinion carried on a shaft 30 which has a suitable bearing in brackets 31 projecting from the hopper. On the shaft 30 is carried a worm wheel 32 in mesh with a worm 33 on the lower end of a manually operated rod 34. This rod is disposed in a vertical position along one side of the main hopper 1 and its superimposed hopper 3 and is journaled in bearings 35 connected with a wall of the main hopper and in a bearing 36 on its superimposed hopper 3. The upper end of the rod 34 is provided with a crank 37 for use by an attendant to turn the rod 34 to operate the worm 33 to impart rotation to the worm wheel 32 and thence to the shaft 30 for moving the valve plate 14 in or out as may be desired. Since the valve plate is provided on its upper exposed surface with a gauge for definitely regulating the distance the valve plate is to be opened, I have provided for frictionally holding the rod 34 in its adjusted positions and to accomplish this, I place a coil spring 38 on the rod 34 between one of the bearings 35 and an adjustable collar 39 on the said rod 34 which is adapted for adjustment to put the required tension in the spring 38, whereby the rod 34 may be frictionally held.

The gauge to which reference has been made is best seen in Fig. 7 and is designated 40. This gauge comprises the use of the names of the various materials which are to be broadcasted over a field and for example may include, "phosphate", "acid phosphate", "lime", "soy beans", and in fact any other material or materials, those indicated being merely selections and not stated as limitations in any sense, and associated with the name of each material is a scale of any character comprising indentations on the valve plate or other suitable markings. For instance, if "phosphate" is to be distributed, each indentation or marker denotes 500 pounds; if "acid phosphate", each indentation or marker represents 200 pounds; for "lime", as the gauge shows a predetermined number of indentations or markers denotes 1, 2, 3 or 4 tons respectively, and if "soy beans" are to be distributed, the indentations or markers are spaced for pecks with numerals associated therewith to designate bushels. I am not aware that a gauge of this character has ever been used in connection with a distributor of this type and, therefore, the illustrations of the gauge are explanatory in character and not intended as limitations in any sense, as it must be obvious that the gauge may be made to adapt the distributor for use in distributing materials of various kind and character.

By examining Figs. 1, 4 and 9, it will be observed that the side walls 5 are formed or provided with half sections of housings 41 with which cooperate and have joined thereto other half sections of housings 42 which provide closures on opposite side walls of the main hopper 1 for enclosing certain gearing to transmit motion from the drive shaft 19 to the agitator shaft 13 and the fan shafts to be described. These closures prevent grit, dust and dirt from accumulating on the gearing therewithin to be described, and if desired, may contain oil in which such gearing may rotate and thereby eliminate noises incident to the rotation of such gearing. In one such closure there is provided on the drive shaft 19 a small gear wheel 43 which meshes with and rotates a larger gear wheel 44 on the feed roller shaft 13 and also on the said drive shaft and within each closure is provided a bevel gear wheel 45, each of which mesh with a bevel pinion 46 on the upper end of a vertically disposed fan shaft 47 to the lower end of which are secured respectively distributing fans 48, similar to fans of like character which heretofore and are now being used on broadcast distributors of this class. The said fan shafts 47 and the bevel pinions 46 are journaled and carried within suitable bearings and housings forming part of or connected with the outer sections 42 of the closures previously referred to. It will be observed from an examination of the figures and particularly Figs. 3 and 4, that the drive shaft 19 and feed roller shaft 13 are offset with respect to each other whereas the fan shafts intersect the axis of the drive shaft 19 from which they receive their power.

Referring to the main grass seed hopper 2, this hopper is in the form of a casting which is adapted for securement to the upper portion of the main hopper 1 and the wall 8 thereof. This hopper has journaled therein and extending therethrough in its upper portion, an agitator shaft 50 with an agitator 51 thereon, comprising a sleeve with suitable vanes or wings 52 to keep the seed in agitation which finds its way to the hopper 2 from the superimposed hopper 4 and on a projected end of said shaft 50 is secured a sprocket pinion 53 with which engages a sprocket chain 54 receiving its power from a sprocket pinion 55 on the drive shaft 19. In the lower portion of the hopper 2 there is arranged a feed roller 56 on a shaft 57 carried through and journaled in the walls of said hopper. The shaft 57 has a gear wheel 58 in mesh with a gear wheel 59 on the shaft 50 and these gears are disposed within a closure comprising a half section 60 from one of the walls of the hopper 2 to which is joined another half section 61 to complete the closure. This housing so formed prevents dust, dirt and grit from accumulating on these gears and provides a container for oil in which the gearing may run. In the lower wall portion of the hopper 2 there is provided an opening 62 in communication with diverging ducts or feedways 63 which diverge from the opening 62 and extend downwardly and outwardly along the wall 8 of the main hopper 1 to the side walls 5 thereof and communicate with the lower portion of the said hopper 1 at a point coincident with and just below the valve plate 14 through recesses 64 provided in the said side walls 5 of said main hopper. It is at this point where the seed from the hopper 2 is discharged into the main hopper 1 in front of the feed roller 12 to be commingled with materials acted upon by the said feed roller 12 and deflected by means of the deflector wall 22 onto the respective fans 48. The ducts or feedways 63 and their discharge points into and through the recesses 64 into the main hopper is best seen in Figs. 3 and 8. Dividing the hopper 2 into agitating and feeding portions is a valve plate 65 manually adjustable and adapted to be secured in adjusted positions by means of a set screw 66. Although not shown, this valve plate may be provided, if it is so desired, with a gauge of similar characteristics to that shown in the valve plate 14 in Fig. 7, and for regulating the quantity of material to be discharged from the said hopper 2 by means of the feed roller 56.

I have previously pointed out that the mechanism includes an improved clutch control means in the drive, which is so constructed that upon the sudden stopping of the vehicle, the clutch means is automatically operated to interrupt the drive to the distributor which will allow the operating parts thereof to idle to a complete stop without abruptness. This clutch driving means and control comprises a sleeve 67 which is adapted to have a predetermined longitudinal adjustable connection with the shaft 19 through which power is imparted to the operating mechanism of the distributor. The inner end of this sleeve is shouldered so as to provide an enlargement 68 and said enlargement is formed with a radially extended portion 69 which is split to form a seat 70 and in said seat is pivotally connected at 71 a split arm 72 in the outer end of which is journaled a roller 73, see Figs. 10 and 11. A coiled spring 74 disposed within the seat 70 and bearing against a shouldered projection 75 normally holds the arm and its roller in an outward position and which is yieldable to permit the arm 72 to be moved inwardly on its pivot. The shouldered projection 75 has a lateral extension 76, see Fig. 10, adapted to be operated upon by a tapered or bell shaped clutch releasing member 77 which is manually slidable on the shaft 19. The means for adjusting said member 77 comprises a rod 78, one end of which is connected with the member and which has its opposite end slidably carried in a bracket 79 secured to the end gate E. Adjustable on the rod 78 at the bracket is a sleeve 80 provided with a forked portion 81, see Fig. 14 and having an operative connection with said forked portion of the sleeve is a rod 82, having a bearing in the bracket 79 and also in a bracket 83 secured to the end gate near its upper edge and the said rod 82 is formed or provided with a crank portion 84 providing a grip or hand hold for an attendant to rock the rod 84 and by so doing shift the rod 78 by the means described and with it the clutch releasing member 77. The outer end of the shaft 19 is supported and has a journal bearing 85 secured to the end gate.

Loosely carried on the sleeve 67 is a sleeve 86 formed or provided with a small sprocket wheel 87 and a larger sprocket wheel 88, in suitable spaced relation and from the inner face of the sprocket wheel 88 projects a drum like member 89 which has a shouldered inner peripheral surface 90, the reduced surface portion of which is formed or provided with a series of inwardly projecting and spaced shouldered members or teeth 91. The reduced surface portion of this drum which is provided with the teeth 91 circumscribes the enlargement 68 on the sleeve 67 whereby to adapt the roller 73 to roll on the reduced inner surface of the drum and to provide for the engagement of the teeth 91 with the said roller, as shown in Fig. 11, to clutch connect the sleeve 68 with the sleeve 67 to impart a driving connection between the said sleeves to operate the shaft 19. Such a clutch connection is effective when the parts are in the positions shown in Fig. 11. When it is desired to disconnect the sleeves 67 and 68, the operator, through the means described, will cause the rod 78 to be moved outwardly, moving with it the clutch disconnecting means 77, which will be caused to enter the drum 89 and the member 77 being tapered will when brought into engagement with the extension 76 and thereby depress the arm 72 to move the roller 73 out of the path of travel and, therefore, out of engagement with the teeth 91. When the parts are in this position no movement can be imparted to the shaft 19. Reversing the movement of the rod 78 will release the arm 72, as will be obvious, and the spring 74 will act to move the arm 72 outwardly and place the roller 73 in the path of the teeth 91, to be engaged by the one or other thereof, as will be understood, and as shown in Fig. 11. The drawing chain D may be caused to engage the teeth of either of the sprocket wheels 87 and 88 which provide when one or the other is used, a changeable speed drive for the shaft 19 when and as may seem desirable. The construction which has been described provides for the adjustment of the sleeves 67 and 86 longitudinally of the shaft 19 to be held in position by the adjusting and securing screw 92, see Fig. 10. When such adjustment is made, the sleeve 80 is released and refastened to adapt itself to such adjustment, by permitting the rod 78 to slide therein and by such adjustment of the parts either of the sprockets 87 or 88 may be aligned with the driving chain D. Furthermore, such structure provides that if the vehicle is suddenly stopped which will naturally stop the rotation of the sleeve 86, the shaft 19 and the parts connected therewith and thereto may be permitted to slow down gradually and stop, without danger of breakage, by reason of the fact that the sleeve 68 rotating with the shaft will carry on and the roller 73 may move forward within the drum 89 and over inclined surfaces provided on the teeth 91, until the shaft finally stops. As shown, these teeth 91 have inclined surfaces 93 which will permit this last described movement and also with shouldered ends 94 for abutment with the roller 73 when clutch connection is desired.

I provide a chain tightener for the chain D which is adjustable to accommodate it to the change of speeds, when using one or the other of the sprocket wheels 87 or 88. This chain tightener comprises a rod 95, one end of which is slidable in a bracket 96 and adapted to be secured therein by a set screw 97, the said bracket being pivotally connected at 98 to the end gate. On the rod 95 is an idler roller 99, over which the return portion of the chain 92 is directed. The outer end of the rod 95 is coupled to a vertically disposed rod 100 which passes up through a part of the bracket 85 and on the upper portion of the said rod 100 is a coiled spring 101, one end of which bears against a part of the bracket 85 and its opposite end bears against a member 102 adjustable on the said rod 100 which is operative to regulate the tension in the said spring 101.

Bracing rods 103 are employed for the structure connected to the hopper structure and connected at the upper opposite corners of the end gate, see Figs. 1 and 2.

It is believed, that without further detail description of the operations of parts and the relation of the several elements and their mode of operation will be clearly understood. It is to be further understood that while I have elected by description and disclosure to show a preferred form of invention, I do not desire to be limited to the precise details thereof, except as defined by the appended claims.

What I claim is:

1. In a broadcast distributor, in combination, a hopper structure including opposite side walls with extensions from the outside thereof to provide half sections of a housing, sections of housings complementary to the said first sections to provide enclosed gear housing on the outside of the hopper, a pair of shafts journaled through said housings and the walls of said hopper, one of said shafts being an agitator shaft and the other a feeding shaft, gearing within one of said housings to connect said shafts, fan shafts disposed transversely to said agitator and feeding shafts, gearing within each of said housings for operating said fan shafts and means for driving said agitator shaft.

2. In a broadcast distributor, in combination, a hopper structure including means for dividing the same into an upper agitating portion and a lower feeding portion and to provide communication therebetween, the side walls of said hopper having recessed portions on their inner faces at a point approximate the division of the hopper into agitating and feeding portions, an auxiliary hopper secured outside of said hopper structure and in communication with feed-ways extending downwardly along a wall of the hopper structure where at their lower portions they communicate with the aforementioned recesses, whereby material may be discharged from the auxiliary hopper into the feeding portion of the hopper structure.

In witness whereof, I have hereunto affixed my hand this 25th day of November, 1929.

JAMES G. BAILEY.